United States Patent [19]

Littwin et al.

[11] Patent Number: 4,542,909
[45] Date of Patent: Sep. 24, 1985

[54] TV CAMERA CART

[75] Inventors: Kenneth M. Littwin; Gabriel R. Buky, both of Chicago, Ill.

[73] Assignee: Electro-Matic Products Co., Chicago, Ill.

[21] Appl. No.: 518,201

[22] Filed: Jul. 28, 1983

[51] Int. Cl.⁴ .................................................. B62B 5/04
[52] U.S. Cl. ............................. 280/79.1 A; 280/79.2; 280/47.35; 354/293
[58] Field of Search ..................... 280/79.1 R, 79.1 A, 280/79.2, 79.3, 47.34, 47.35, 43.24, 43.14; 248/680, 681, 500; 269/91, 93; 403/373; 354/293

[56] References Cited

U.S. PATENT DOCUMENTS

| | | | |
|---|---|---|---|
| 2,847,904 | 8/1958 | Nosco | 280/79.3 |
| 3,987,871 | 10/1976 | Nordskog | 280/43.24 |
| 4,044,978 | 8/1977 | Williams | 280/79.1 A |

Primary Examiner—David M. Mitchell
Assistant Examiner—Richard Camby
Attorney, Agent, or Firm—Paul H. Gallagher

[57] ABSTRACT

The cart is made as a unitary and rigid frame, having a lower platform and an elevated platform, both forming wells for holding loose items. The elevated platform is triangular, and the tripod supporting the TV camera is placed thereon, and releasably locked. The elevated platform is of less area than the lower platform, exposing a portion of the latter, and an adjustable operator's seat is mounted on the frame, over the exposed position of the lower platform. Wheels are provided, non-castering at a rear end of the cart, and casters at the front end, and a brake at the front end between the casters actuatable by the foot and when in braking position, lifting the front end of the cart off the floor.

5 Claims, 7 Drawing Figures

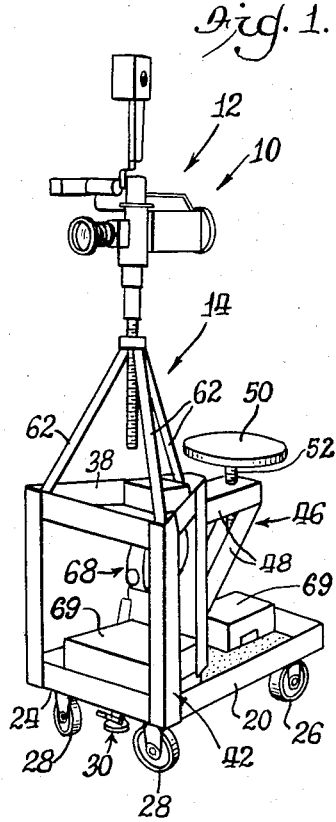
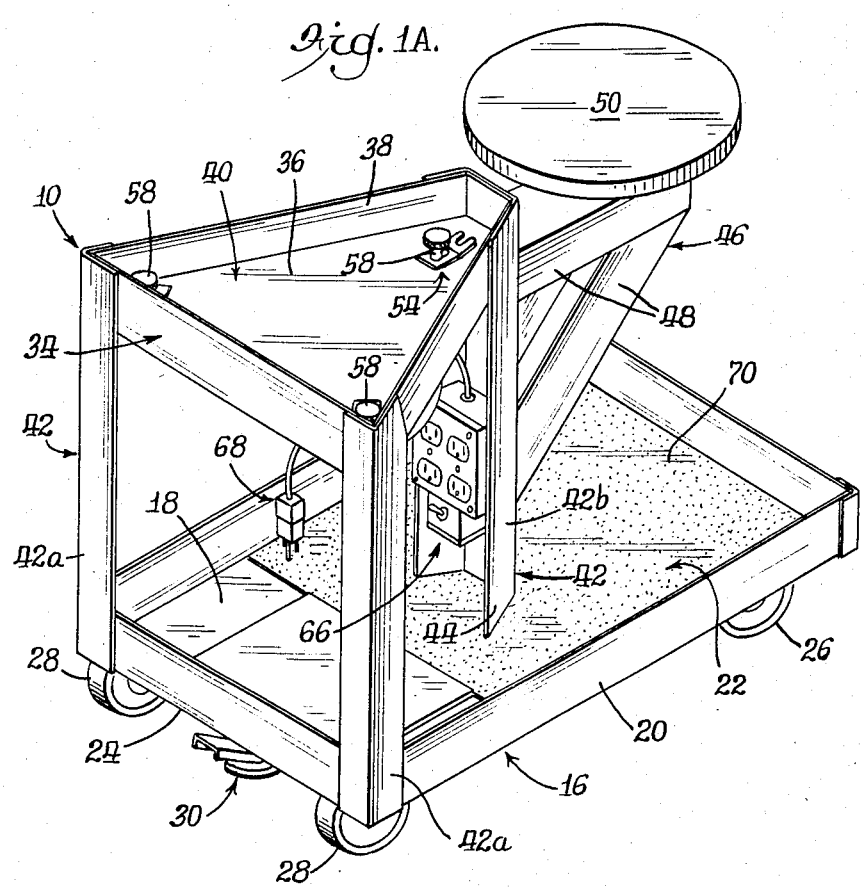
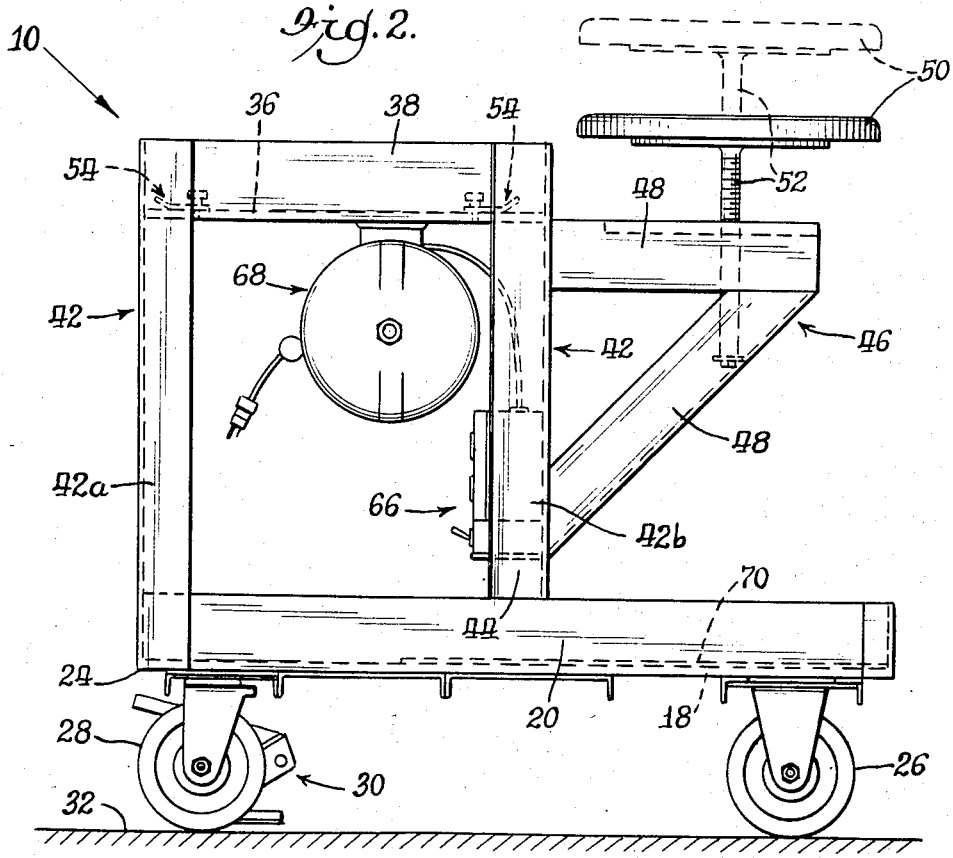

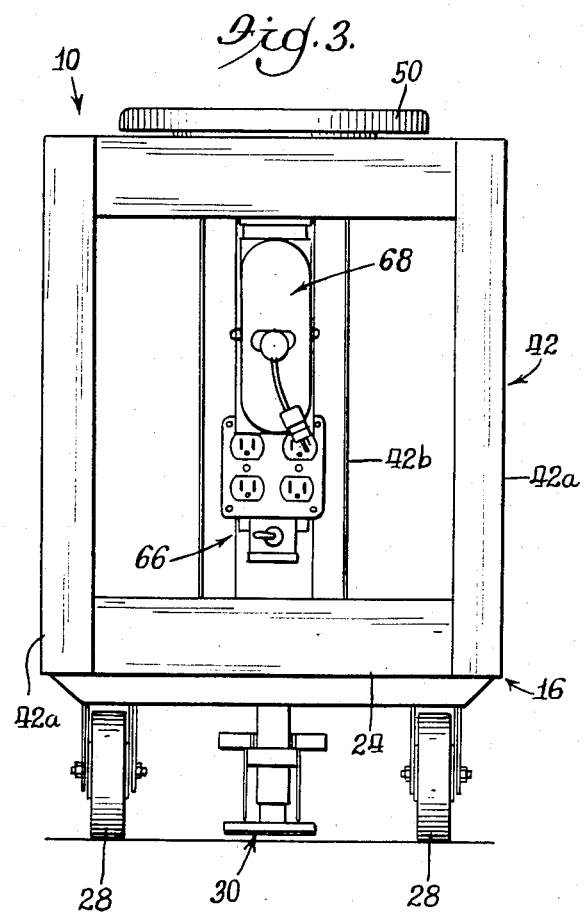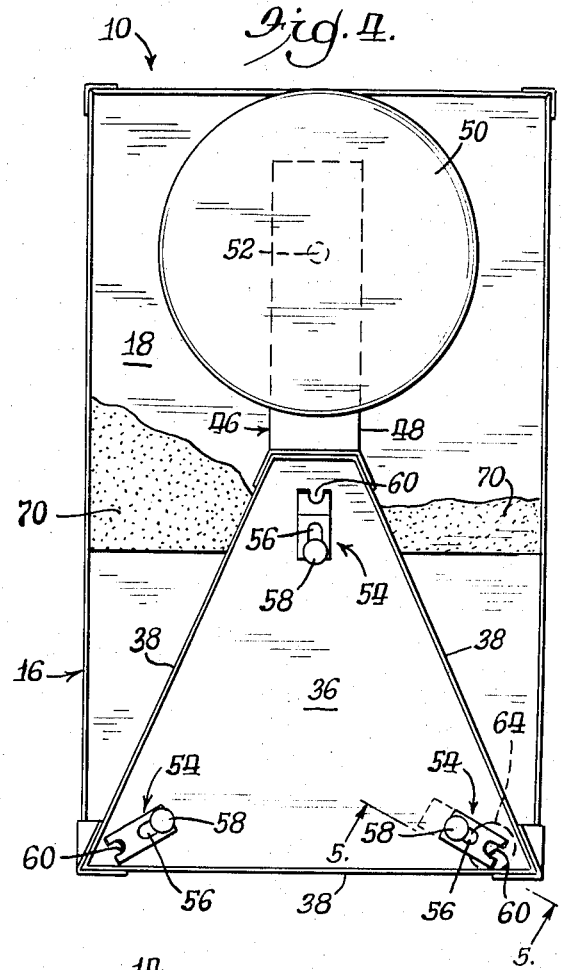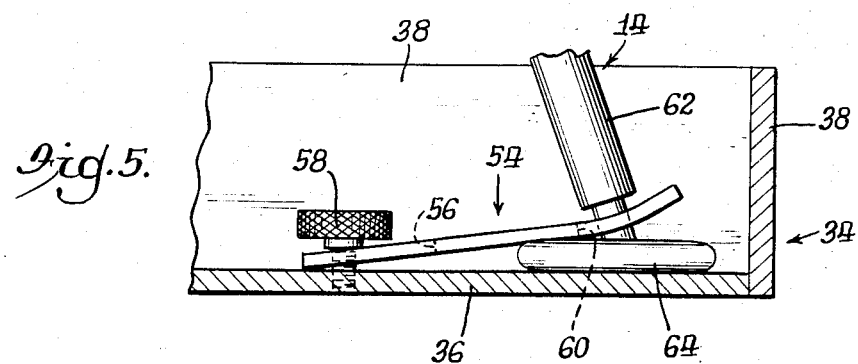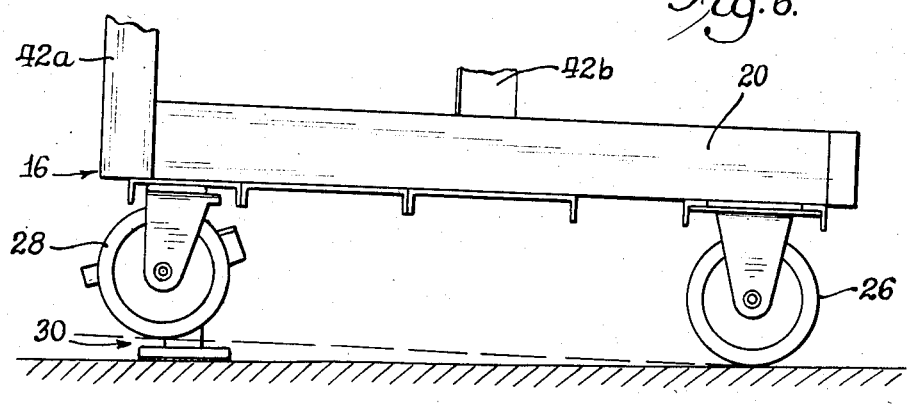

TV CAMERA CART

OBJECTS OF THE INVENTION

A main object of the invention is to provide a cart for mounting a TV camera and supporting related appurtenances, for easy movement about the scene of use of the camera.

A further object is to provide such a TV camera cart having the following features and advantages:

1. The TV camera with a tripod can be quickly and easily put in place on the cart, demountably so, wherein it can be locked, and is made steady thereon, and held steady in the movements of the cart.
2. It is of small size, to enable it to be easily moved into congested places, and maneuvered therein.
3. It is of very simple design, enabling the user to easily assume a position for viewing through the camera, and notwithstanding its simple design, is capable of supporting other pieces of equipment and these made readily accessible for use.
4. It is provided with a seat which can be utilized in operating the camera, and for that purpose the seat is made adjustable to accommodate different sized persons, and the cart can be moved, though usually in a limited manner, by the user, when seated, by engaging his feet with the floor and pushing the cart.

DESCRIPTION OF A PREFERRED EMBODIMENT

In the drawings,

FIG. 1 a perspective view of the TV camera cart of the invention, with a TV camera mounted on a tripod, together mounted on the cart;

FIG. 1A is a large scale view of the cart itself without the TV camera and tripod;

FIG. 2 is a side elevational view of the cart;

FIG. 3 is an end view taken from the left of FIG. 2;

FIG. 4 is a top view;

FIG. 5 is a detail fragmentary view taken at line 5—5 of FIG. 4 with a fragment of a leg of the tripod therein; and FIG. 6 is a side elevational view of the lower portion of the cart shown in braked position.

Referring in detail to the accompanying drawings, attention is directed to FIG. 1 showing the TV camera cart in its entirety at 10, with a TV camera 12 on a tripod 14 together mounted on the cart. The camera and tripod are of course of known kind and the details of how they are mounted on the cart will be referred to hereinbelow.

The cart 10 includes a frame 16, preferably of steel, and includes a floor or panel 18 forming a lower platform surrounded by side wall 20 forming a well 22.

The cart is referred to as having a front end 24, for convenience, and the cart is provided with rear wheels 26 fixed about vertical axes, i.e., non-castering, and wheels 28 in the form of casters at the front end.

A brake means 30 of known kind is mounted on the lower side of the lower platform, at the front end between the casters, and in inactive position is elevated from the floor 32 (FIG. 2) on which the cart rests. The brake is actuatable by the foot to a lowered braking position (FIG. 6) in which it engages the floor and raises the front end of cart off of the floor and because of the non-castering nature of the rear wheels, the cart is held substantially immovable.

The lower platform is preferably of rectangular shape, and elongated from front to rear, and mounted at the front of the lower platform is an elevated platform 34 of triangular shape having a base end in register with the front end of the lower platform and its apex end directed rearwardly, the upper platform extending rearwardly substantially less than the lower platform. The elevated platform includes a floor or bottom panel 36 surrounded by a side wall 38 forming a well 40. The elevated platform is mounted on posts 42, two of which, 42a, may be angle irons at the base end of the triangle and secured at the front corners of the lower platform. Another of the posts, 42b, is positioned at the rear or apex of the triangle of the elevated platform and is preferably of channel shape, having side flanges 44, this post being mounted on the floor or panel 18 of the lower platform.

Secured to the post 42b and extending rearwardly of the cart, is a mounting support or bracket 46 preferably of triangular shape having legs 48 secured directly to the post 42b and converging rearwardly. These elements 48 may be channel irons. A seat 50 of known kind is mounted on the support 46, the seat having a threaded shank 52 threaded in the support 46 for vertically adjusting the seat.

Locking means is provided for releasably locking the camera tripod in place on the elevated platform. Brackets 54 are provided for this purpose, each having an elongated slot 56 (FIGS. 4 and 5) in which is a mounting pin 58, the pin being secured in the floor or panel 36. Each bracket includes at its other end an open notch 60. There is one of these brackets at each of the corners of the triangle. Referring to FIG. 5, there is shown one leg 62 of the tripod which includes a relatively large foot element 64.

The tripod is placed on the elevated platform 34 and in this step, the brackets 54 are first retracted to releasing position and then the tripod is placed on the floor of the platform, outwardly of the brackets 54. The brackets are then moved outwardly to locking position in which the outer ends of the brackets overlie the feet 64, and the feet are forced against the side walls, and the pins 58 turned down to locking position against the feet 64 and thus locking the tripod in position.

The electrical circuit includes components 66 such as outlet boxes, switches, etc., mounted in the space defined between the side flanges of the rear post 42b, and the relatively great depth of this space is utilized for semi-concealing those components.

An extension cord reel 68 is mounted on the lower side of the upper platform, this reel enabling the extension cord to be plugged into a source at a considerable distance. The depth of the wells in the lower platform and elevated platform provides a convenient place to carry various items, 69, e.g., portable components used in connection with the TV camera, or otherwise. The rear portion of the lower platform forms a foot well and is preferably provided with a covering 70, of suitable material to provide a rough surface to prevent slipping of the foot of the operator in the use of the cart.

The cart may be of any convenient dimension, and in one manner of using it, the operator would be standing and can easily move the cart anywhere in the range of its intended use. The tripod can of course be adjusted to any suitable height to enable him to use the camera in standing position, and to move the cart while actually viewing through the camera. The cart provides steadiness and stability to the camera even while the cart is in movement, in extreme contrast to the usual portable camera carried by the person.

The seat 50 is convenient for the user to rest while not actually viewing, but it is also within the scope of the invention that the camera can be lowered to such position where he can view through it while seated. The cart is easily manipulable, and even when he is seated, and viewing through the camera, he can move the cart by footwork, i.e., engaging his feet with the floor, and pushing or shoving the cart.

The cart is extremely simple in its design and construction, and correspondingly inexpensive. The frame of the cart is made from stock materials, and all of the other elements are standard items including the wheels, the seat, the electrical components.

I claim:

1. A TV camera cart for use with a tripod of which the legs have large feet elements, comprising,
    a frame and wheels mounted therein for supporting the cart on the floor,
    the frame including a lower platform for placement of pieces of TV equipment, the lower platform being of rectangular shape,
    the frame also including an elevated platform for mounting thereon of a tripod supporting a TV camera,
    the elevated platform being of triangular shape, having its base end substantially in register with a front end of the lower platform, and its apex end extending over the lower platform toward the rear end of the lower platform, but terminating short of the latter, providing great area of the lower platform uncovered by the elevated platform, and
    locking means on the elevated platform including adjustable brackets moveable into and out of position over the feet elements for releasably securing tripod in place on the elevated platform.

2. A TV camera cart according to claim 1 wherein,
    the elevated platform includes a floor panel and a surrounding side wall forming a well for receiving and confining articles placed in the well,
    the brackets of the locking means being positioned on that floor panel adjacent the corners thereof, and are movable horizontally outwardly to locking position and thereby confining the lower end of the tripod legs against the surrounding side wall, and movable inwardly to unlocking position and releasing the tripod.

3. A TV camera cart according to claim 1 wherein,
    the frame includes a post supporting the apex end of the elevated platform and itself supported on the lower platform, and
    the cart including a seat mounted on said post and extending toward the rear end of the cart.

4. A TV camera cart according to claim 1 wherein,
    the lower platform includes a floor panel and a surrounding side wall forming a well for receiving and retaining articles placed in the well, and the rear portion of that well also serving as a foot well area, and the floor panel in the foot well area being provided with a high friction surface.

5. A TV camera cart according to claim 3 wherein
    the cart includes electrical components for connection of a TV camera mounted on the cart with an electrical source including an extension cord on a reel,
    said post is of channel shape with flanges of substantial dimension in front to rear direction forming a corresponding space, and
    at least certain of said electrical components are mounted in said space in semi-enclosed position.

* * * * *